(12) United States Patent
Bao et al.

(10) Patent No.: US 11,382,337 B2
(45) Date of Patent: Jul. 12, 2022

(54) METHOD FOR IMPROVING THE QUALITIES OF IMMATURE COFFEA ARABICA FRUITS

(71) Applicant: PU'ER UNIVERSITY, Puer (CN)

(72) Inventors: Xiaohua Bao, Puer (CN); Xuan Dong, Puer (CN); Wenzhang Cheng, Puer (CN); Zhilin Jiang, Puer (CN)

(73) Assignee: Pu'er University, Puer (CN)

( * ) Notice: Subject to any disclaimer, the term of this patent is extended or adjusted under 35 U.S.C. 154(b) by 278 days.

(21) Appl. No.: 16/741,296

(22) Filed: Jan. 13, 2020

(65) Prior Publication Data

US 2021/0112823 A1 Apr. 22, 2021

(51) Int. Cl.
*A23F 5/02* (2006.01)

(52) U.S. Cl.
CPC ..................................... *A23F 5/02* (2013.01)

(58) Field of Classification Search
CPC ....................................................... A23F 5/02
See application file for complete search history.

(56) References Cited

U.S. PATENT DOCUMENTS

| | | | |
|---|---|---|---|
| 2009/0104309 A1* | 4/2009 | Nakajima | A23F 5/02 426/45 |
| 2009/0104310 A1* | 4/2009 | Nakajima | A23F 5/02 426/45 |
| 2010/0143539 A1* | 6/2010 | Minami | A23F 5/02 426/45 |
| 2015/0257405 A1* | 9/2015 | Kelly | A23F 5/02 426/45 |
| 2016/0324179 A1* | 11/2016 | Park | A23F 5/02 |
| 2021/0045403 A1* | 2/2021 | Howell | A23L 27/204 |

* cited by examiner

*Primary Examiner* — Anthony J Weier
(74) *Attorney, Agent, or Firm* — Bay State IP, LLC

(57) ABSTRACT

A primary processing technology for effectively improving the qualities of immature coffea *Arabica* fruits, in which the immature coffea *Arabica* fruits, particularly the coffee cherries picked at the last batch, are subjected to selecting, cleansing, drying, peeling, fermentation, the first sun-cure, stacking, kneading, the second sun-cure, to achieve the primary processing on the immature coffea *Arabica* fruits, thus obtaining coffee beans in the shell, which could effectively reduce the production of defects, increase the aroma of coffee beans, enhance the level of body, making the coffee beans with bright and lively sour taste and a lasting taste, thus enhancing the qualities of the immature coffea *Arabica* fruits. The SCAA cupping scores of the coffee beans in the shell obtained after being processed were not lower than 84, while the SCAA scores of the coffee beans in the shell obtained with the existing technology were not greater than 75.

9 Claims, No Drawings

METHOD FOR IMPROVING THE QUALITIES OF IMMATURE COFFEA ARABICA FRUITS

CROSS REFERENCE TO RELATED APPLICATION

This application claims the benefit of and takes priority from Chinese Patent Application Serial No. 201911004231.9 filed on Oct. 22, 2019, the contents of which are herein incorporated by reference.

BACKGROUND OF THE INVENTION

Field of the Invention

The present invention concerns the technical field of coffee beans processing, particularly a primary processing technology for improving the qualities of immature coffea *Arabica* fruits.

Description of the Related Art

Coffee is the commercial crop with its production, consumption and economic value all being the first in the three major beverages in the world, also is one of the largest tropical food materials in the world, being the second largest raw material products ranking next only to petroleum in international trade. Coffee cultured in the world includes Robusta coffee and *Arabica* coffee, with *Arabica* coffee accounting 65%, and in China, *Arabica* coffee accounting up to more than 99%, and all concentrated in Yunnan Province. The consumption of coffee in China is growing at a high speed, with the average annual growth rate over 20% in recent three years. It needs a period of 6-9 months from blossom to maturity for coffee, the maturation period is affected by the conditions of the altitude, the temperature and the cultivated varieties. The primary processing determines the quality level of coffee beans. Fresh coffee fruits need to be primarily processed after harvest, the common primary processing methods include the water washing method, the sun-cure method, the honey process, etc.

During the picking of coffea *Arabica* in Yunnan Province, although mature coffee cherries were usually selected to be picked, there were always some immature coffee cherries, especially the coffee cherries picked at the last batch, including green fruits, yellow fruits, orange fruits, yellow fruits, carroty fruits, light red fruits, purple-black fruits, dried fruits, with the majority being immature fruits. For processing with the water washing method, peeling was not clean, drying was not uniform, there were many yellow beans and black beans, it was prone to produce unpleasant odor during drying, with smells of fresh grass, low level of body, and insufficient aroma; for processing with the sun-cure method, drying was not uniform, it was prone to produce beans with defects and unpleasant odor during drying; for processing with yellow honey, red honey, and black honey, they cannot be produced with honey due to the low sugar content in the immature coffee cherries. Therefore, the qualities were all undesirable for processing with the water washing method, the sun-cure method, and the honey process. When being evaluated with SCAA scores, in the instance without deducting for defects, the scores were generally about 70, not more than 75; if there were defects, the scores would be lower than 70, and there were few instances without defects.

SUMMARY OF THE INVENTION

To resolve the above problems of the prior art, the present invention provides a primary processing technology for effectively improving the qualities of immature coffea *Arabica* fruits. The processing technology of the invention could effectively reduce the production of defects, increase the aroma of coffee beans, enhance the level of body, making the coffee beans with bright and lively sour taste and a lasting taste, thus enhancing the qualities of the immature coffea *Arabica* fruits.

The present invention is the research achievement of "Pu'er coffea *Arabica* quality improvement and innovation team" (Team No. CXTD002) and "Public Technological Platforms for Quality Optimization and Value Enhancement of Coffee in Yunnan Province" (Yunnan Science and Technology [2016] No. 1).

The technical solution employed in the present invention is:

A primary processing technology for effectively improving the qualities of immature coffea *Arabica* fruits, including the following steps:

(1) selecting the immature coffea *Arabica* fruits, removing green fruits, ready for use;

(2) cleansing the immature coffea *Arabica* fruits selected in step (1), which were drained and then dried in the sun, ready for use;

(3) peeling the immature coffea *Arabica* fruits after treatment in step (2) to obtain the mixtures of coffee beans in the shell;

(4) adding a fermentation liquid into the mixture of coffee beans in step (3), mixing thoroughly for fermentation, to obtain the fermentation products;

(5) performing the first sun-cure, stacking, kneading, the second sun-cure on the fermentation products of step (4) successively, completing the primary processing of the immature coffea *Arabica* fruits.

In step (1), the immature coffea *Arabica* fruits are the mixture of various coffee cherries including yellow fruits, orange fruits, yellow fruits, carroty fruits, light red fruits, purple-black fruits and dried fruits.

In step (2), the temperature for drying is 25-40° C., the laying thickness during drying is 2-5 cm, and the time for drying is 2-3 days;

the moisture content of coffee cherries obtained after drying is 70-80 wt %.

In step (3), the peeling treatment is extrusion peeling, without adding water during the peeling treatment.

In step (3), the mixtures of coffee beans are the mixtures including coffee beans in the shell, half-peeled coffee beans, and coffee peel-wrapped coffee cherries.

The fermentation liquid is made by employing the following process:

(S1) taking full-ripe bananas, mashing to a banana paste, ready for use;

(S2) taking pineapples, cutting into small pieces, and squeezing to make pineapple juice;

(S3) mixing the banana paste and the pineapple juice thoroughly, to obtain the fermentation liquid.

The mass ratio of the banana paste to the pineapple juice is 0.8:1-1:1.

In step (4), the mass ratio of the fermentation liquid to the mixtures of coffee beans is 1:5-1:8.

In step (4), the temperature for fermentation is 25-28° C., the time for fermentation is 33-35 h.

In step (5), the temperature for the first sun-cure is not greater than 43° C., the time for the first sun-cure is 4-6 days, the moisture content of the mixtures of coffee beans after the first sun-cure is 20-30 wt %;

the time for stacking is 44-52 h;

the time for kneading is 10-15 min;

the temperature for the second sun-cure is not greater than 43° C., the time for the second sun-cure is 3-4 days, the moisture content of the mixtures of coffee beans after the second sun-cure is 11-12 wt %.

After fermentation, the mixture of coffee beans was laid on the hack or the drying barbecue for the first sun-cure, the sun-cure thickness was 2 cm, without being directly irradiated by the sun, preferably placed in drying tents, in which the temperature was not higher than 43° C. After sun-cure for 4-6 days (the broad time range was because of the climate), when the moisture content of the mixture of coffee beans was around 20 wt %, the mixture of coffee beans was packaged into woven bags and stacked for about 48 h (2 days). After 2 days, the mixture of coffee beans was kneaded for 10-15 min, at this moment sending out the aroma of honey and flowers, as well as the aroma of pineapples and bananas. After kneading, the mixture of coffee beans was laid on the hack or the drying barbecue for the second sun-cure, the sun-cure thickness was 3-4 cm, without being directly irradiated by the sun, preferably placed in drying tents, in which the temperature was not higher than 43° C. After sun-cure for 3-4 days (the broad time range was because of the climate), when the moisture content of the mixture of coffee beans was 11-12 wt %, the processing was completed. The obtained mixture of coffee beans was known as coffee beans in the shell.

The beneficial effects of the present invention are:

With the processing technology of the present invention, the immature coffea *Arabica* fruits, particularly the coffee cherries picked at the last batch, are subjected to selecting, cleansing, drying, peeling, fermentation, the first sun-cure, stacking, kneading, the second sun-cure successively, to achieve the primary processing on the immature coffea *Arabica* fruits, thus obtaining coffee beans in the shell, which could effectively reduce the production of defects, increase the aroma of coffee beans, enhance the level of body, making the coffee beans with bright and lively sour taste and a lasting taste, thus enhancing the qualities of the immature coffea *Arabica* fruits.

The coffee beans in the shell obtained after treatment with the process of the present invention were evaluated with SCAA cupping, the flavor of which was described as: having the aroma of Hami melon, peanut, sesame, white chocolate, and cedar, with the aroma of lilac in the aftertaste; good acid quality, bright and lively; a high level of body; fast sweet after taste, moderate intensity, long-lasting; a lasting taste; good balance. The roast level of SCAA cupping was cinnamon; and the score of SCAA cupping was not lower than 84. However, the SCAA scores of coffee beans processed by the water washing method, the sun-cure method, and the honey process were not greater than 75. Compared with the water washing method in the prior art, the processing technology of the present invention can effectively reduce water consumption and realize green and economical production.

DETAILED DESCRIPTION OF THE SEVERAL EMBODIMENTS

For understanding the objects, technical solutions and advantages of the present invention more clearly, the technical solutions of the present invention would be described in detail below. It is obvious that the described embodiments were only part of embodiments of the present invention, not all the embodiments. Based on the embodiments in the present invention, all the other detailed description obtained by persons with ordinary skills in the art without creative labors all belongs to the scope of the invention.

Embodiment 1

This embodiment provides a primary processing technology for effectively improving the qualities of immature coffea *Arabica* fruits, including the following steps:

(1) selecting the immature coffea *Arabica* fruits picked at the last batch, the immature coffea *Arabica* fruits were the mixture of various coffee cherries including green fruits, yellow fruits, orange fruits, yellow fruits, carroty fruits, light red fruits, purple-black fruits and dried fruits, artificially removing the green fruits from the immature coffea *Arabica* fruits, ready for use;

(2) cleansing the immature coffea *Arabica* fruits selected in step (1), which were drained and then dried in the sun at 30-35° C. for 2 days, the laying thickness during drying was 4-5 cm, to obtain the coffee cherries in the shell with a moisture content of 75 wt %;

(3) performing an extrusion peeling treatment on the coffee cherries in the shell of step (2) in a coffee peeling machine, without adding water during the peeling treatment, the majority of the materials coming out from the outlet of the peeling machine had been extruded into coffee beans, which were half-peeled coffee beans of which the peel had been removed and part of the coffee cherries had been extruded, a small part of the materials were full-wrapped with peel, that is the mixture of coffee beans including coffee beans in the shell, half-peeled coffee beans, coffee peel-wrapped coffee cherries;

(4) adding a fermentation liquid into the mixture of coffee beans in step (3), the mass ratio of the fermentation liquid to the mixture of coffee beans was 1:6, mixing thoroughly with stirring, and then fermentation at 26-27° C. for 34 h, to obtain the fermentation products;

the fermentation liquid is made by employing the following process:

(S1) taking full-ripe bananas, mashing to a banana paste, ready for use;

(S2) taking pineapples, cutting into small pieces, and squeezing to make pineapple juice;

(S3) mixing the banana paste and the pineapple juice thoroughly at a mass ratio of 1:1, to obtain the fermentation liquid;

(5) the fermentation products of step (4) were laid on the hack for the first sun-cure, the sun-cure thickness was 2 cm, without being directly irradiated by the sun, preferably placed in drying tents, in which the temperature was not higher than 43° C. After sun-cure for 5 days, when the moisture content of the mixture of coffee beans was 20 wt %, the mixture of coffee beans was packaged into woven bags and stacked for 48 h, after then the mixture of coffee beans was kneaded for 12 min, at this moment sending out the aroma of honey and flowers, as well as the aroma of pineapples and bananas. After kneading, the mixture of coffee beans was laid on the hack for the second sun-cure, the sun-cure thickness was 3 cm, without being directly irradiated by the sun, preferably placed in drying tents, in which the temperature was not higher than 43° C. After sun-cure for 3 days, when the moisture content of the mixture of coffee beans was 11 wt %, the processing was completed, finishing the primary processing of the immature coffea *Arabica* fruits, the obtained mixture of coffee beans was known as coffee beans in the shell.

Embodiment 2

This embodiment provides a primary processing technology for effectively improving the qualities of immature coffea *Arabica* fruits, including the following steps:

(1) selecting the immature coffea *Arabica* fruits, the immature coffea *Arabica* fruits were the mixture of various coffee cherries including green fruits, yellow fruits, orange fruits, yellow fruits, carroty fruits, light red fruits, purple-black fruits and dried fruits, removing the green fruits from the immature coffea *Arabica* fruits with a coffee cherries sorting machine, ready for use;

(2) cleansing the immature coffea *Arabica* fruits selected in step (1), which were drained and then dried in the sun at 28-32° C. for 3 days, the laying thickness during drying was 2-3 cm, to obtain the coffee cherries in the shell with a moisture content of 70 wt %;

(3) performing an extrusion peeling treatment on the coffee cherries in the shell of step (2) in a coffee peeling machine, without adding water during the peeling treatment, the majority of the materials coming out from the outlet of the peeling machine had been extruded into coffee beans, which were half-peeled coffee beans of which the peel had been removed and part of the coffee cherries had been extruded, a small part of the materials were full-wrapped with peel, that is the mixture of coffee beans including coffee beans in the shell, half-peeled coffee beans, coffee peel-wrapped coffee cherries;

(4) adding a fermentation liquid into the mixture of coffee beans in step (3), the mass ratio of the fermentation liquid to the mixture of coffee beans was 1:5, mixing thoroughly with stirring, and then fermentation at 25-26° C. for 35 h, to obtain the fermentation products;

the fermentation liquid is made by employing the following process:

(S1) taking full-ripe bananas, mashing to a banana paste, ready for use;

(S2) taking pineapples, cutting into small pieces, and squeezing to make pineapple juice;

(S3) mixing the banana paste and the pineapple juice thoroughly at a mass ratio of 0.8:1, to obtain the fermentation liquid;

(5) the fermentation products of step (4) were laid on the hack for the first sun-cure, the sun-cure thickness was 2 cm, without being directly irradiated by the sun, preferably placed in drying tents, in which the temperature was not higher than 43° C. After sun-cure for 4 days, when the moisture content of the mixture of coffee beans was 30 wt %, the mixture of coffee beans was packaged into woven bags and stacked for 44 h, after then the mixture of coffee beans was kneaded for 10 min, at this moment sending out the aroma of honey and flowers, as well as the aroma of pineapples and bananas. After kneading, the mixture of coffee beans was laid on the hack for the second sun-cure, the sun-cure thickness was 3 cm, without being directly irradiated by the sun, preferably placed in drying tents, in which the temperature was not higher than 43° C. After sun-cure for 3 days, when the moisture content of the mixture of coffee beans was 11 wt %, the processing was completed, finishing the primary processing of the immature coffea *Arabica* fruits, the obtained mixture of coffee beans was known as coffee beans in the shell.

Embodiment 3

This embodiment provides a primary processing technology for effectively improving the qualities of immature coffea *Arabica* fruits, including the following steps:

(1) selecting the immature coffea *Arabica* fruits, the immature coffea *Arabica* fruits were the mixture of various coffee cherries including green fruits, yellow fruits, orange fruits, yellow fruits, carroty fruits, light red fruits, purple-black fruits and dried fruits, removing the green fruits from the immature coffea *Arabica* fruits, ready for use;

(2) cleansing the immature coffea *Arabica* fruits selected in step (1), which were drained and then dried in the sun at 25-30° C. for 3 days, the laying thickness during drying was 3-4 cm, to obtain the coffee cherries in the shell with a moisture content of 80 wt %;

(3) performing an extrusion peeling treatment on the coffee cherries in the shell of step (2) in a coffee peeling machine, without adding water during the peeling treatment, the majority of the materials coming out from the outlet of the peeling machine had been extruded into coffee beans, which were half-peeled coffee beans of which the peel had been removed and part of the coffee cherries had been extruded, a small part of the materials were full-wrapped with peel, that is the mixture of coffee beans including coffee beans in the shell, half-peeled coffee beans, coffee peel-wrapped coffee cherries;

(4) adding a fermentation liquid into the mixture of coffee beans in step (3), the mass ratio of the fermentation liquid to the mixture of coffee beans was 1:8, mixing thoroughly with stirring, and then fermentation at 27-28° C. for 33 h, to obtain the fermentation products;

the fermentation liquid is made by employing the following process:

(S1) taking full-ripe bananas, mashing to a banana paste, ready for use;

(S2) taking pineapples, cutting into small pieces, and squeezing to make pineapple juice;

(S3) mixing the banana paste and the pineapple juice thoroughly at a mass ratio of 0.9:1, to obtain the fermentation liquid;

(5) the fermentation products of step (4) were laid on the hack for the first sun-cure, the sun-cure thickness was 2 cm, without being directly irradiated by the sun, preferably placed in drying tents, in which the temperature was not higher than 43° C. After sun-cure for 6 days, when the moisture content of the mixture of coffee beans was 25 wt %, the mixture of coffee beans was packaged into woven bags and stacked for 52 h, after then the mixture of coffee beans was kneaded for 15 min, at this moment sending out the aroma of honey and flowers, as well as the aroma of pineapples and bananas. After kneading, the mixture of coffee beans was laid on the hack for the second sun-cure, the sun-cure thickness was 4 cm, without being directly irradiated by the sun, preferably placed in drying tents, in which the temperature was not higher than 43° C. After sun-cure for 4 days, when the moisture content of the mixture of coffee beans was 12 wt %, the processing was completed, finishing the primary processing of the immature coffea *Arabica* fruits, the obtained mixture of coffee beans was known as coffee beans in the shell.

Comparative Embodiment 1

This comparative embodiment differs from Embodiment 1 only in that there was no banana paste added in the fermentation liquid, and there was only the ingredient of pineapple juice.

Comparative Embodiment 2

This comparative embodiment differs from Embodiment 1 only in that the fermentation liquid was the mixture of banana paste and water at a mass ratio of 1:1

EXPERIMENTAL EXAMPLE

The coffee beans obtained in embodiments 1-3 and comparative embodiments 1-2 were scored by SCAA cupping, the scoring results were shown in Table 1.

TABLE 1

SCAA scores of different coffee beans in the shell

| Detection Items Samples | Drought-wet aroma | Flavor | Aftertaste | Acid quality | Sense of body fat | Consistency | Balance | Cleanliness | Sweetness level | Comprehensive consideration | Comprehensive scores |
|---|---|---|---|---|---|---|---|---|---|---|---|
| Embodiment 1 | 7.75 | 7.5 | 7.75 | 8.25 | 8.0 | 10 | 7.75 | 10 | 10 | 8.25 | 85 |
| Embodiment 2 | 7.75 | 7.75 | 7.5 | 8.5 | 7.75 | 10 | 7.5 | 10 | 10 | 8.0 | 85 |
| Embodiment 3 | 8.0 | 7.75 | 7.5 | 8.5 | 7.5 | 10 | 7.5 | 10 | 10 | 8.0 | 84.75 |
| Comparative Embodiment 1 | 6.5 | 6.5 | 6.25 | 7.5 | 6.25 | 10 | 6.5 | 10 | 10 | 6.25 | 75.25 |
| Comparative Embodiment 2 | 6.25 | 6.5 | 6.5 | 7.75 | 6.0 | 10 | 6.25 | 10 | 10 | 6.25 | 74.5 |

As can be seen from Table 1, the SCAA cupping scores of the coffee beans in the shell obtained after the immature coffea *Arabica* fruits were primarily processed with the processing technology of embodiments 1-3 in the present invention were not lower than 84, while the SCAA scores of the coffee beans in the shell processed with the methods in the comparative embodiments were only about 75, indicating that it played an important role to add the fermentation liquid, and the fermentation liquid must was the mixture composed of banana paste and pineapple juice at certain mass ratios.

The above description was only the detailed description of the present invention. However, the scope of the present invention was not limited to this, and any variations or substitutions readily thought by persons familiar with the art within the technical scope disclosed in the present invention should all be considered in the scope of the invention. Therefore, the scope of the present invention should be subject to the scope of the claims.

What is claimed is:

1. A method for effectively improving the qualities of immature coffee *Arabica* fruits, the method comprising:
   (1) selecting the immature coffee *Arabica* fruits, and removing green fruits;
   (2) cleansing the immature coffee *Arabica* fruits selected in step (1), which were drained and then dried in the sun;
   (3) peeling the immature coffee *Arabica* fruits after treatment in step (2) to obtain mixtures of coffee beans in the shell;
   (4) adding a fermentation liquid into the mixtures of coffee beans in the shell in step (3), mixing thoroughly for fermentation to obtain fermentation products; and
   (5) performing a first sun-cure, stacking, kneading and a second sun-cure on the fermentation products of step (4) successively;
   wherein the immature coffee *Arabica* fruits are a mixture of coffee cherries including green fruits, yellow fruits, orange fruits, red-orange fruits, light red fruits, purple-black fruits, and naturally dried fruits.

2. The method of claim 1, which is characterized in that, in step (2), the temperature for drying is 25-40° C., a laying thickness during drying is 2-5 cm, and the time for drying is 2-3 days; and
   the moisture content of coffee cherries obtained after drying is 70-80 wt %.

3. The method of claim 1, which is characterized in that, in step (3), the peeling treatment is extrusion peeling.

4. The method of claim 1, which is characterized in that, in step (3), the mixtures of coffee beans in the shell include coffee beans with shell, coffee beans with partially removed outer cherry coat, and coffee cherries with intact outer cherry coat.

5. The method of claim 1, which is characterized in that, the fermentation liquid is made by employing the following process:
   (S1) taking full-ripe bananas, mashing to a banana paste;
   (S2) taking pineapples, cutting into small pieces, and squeezing to make pineapple juice;
   (S3) mixing the banana paste and the pineapple juice thoroughly, to obtain the fermentation liquid.

6. The method of claim 5, which is characterized in that, the mass ratio of the banana paste to the pineapple juice is 0.8:1-1:1.

7. The method of claim 1, which is characterized in that, in step (4), the mass ratio of the fermentation liquid to the mixtures of coffee beans is 1:5-1:8.

8. The method of claim 1, which is characterized in that, in step (4), the temperature for fermentation is 25-28° C., the time for fermentation is 33-35 h.

9. The method of claim 1, which is characterized in that, in step (5), the temperature for the first sun-cure is not greater than 43° C., the time for the first sun-cure is 4-6 days, the moisture content of the mixtures of coffee beans after the first sun-cure is 20-30 wt %;
   the time for stacking is 44-52 h;
   the time for kneading is 10-15 min;
   the temperature for the second sun-cure is not greater than 43° C., the time for the second sun-cure is 3-4 days, the moisture content of the mixtures of coffee beans after the second sun-cure is 11-12 wt %.

* * * * *